Figure 1:
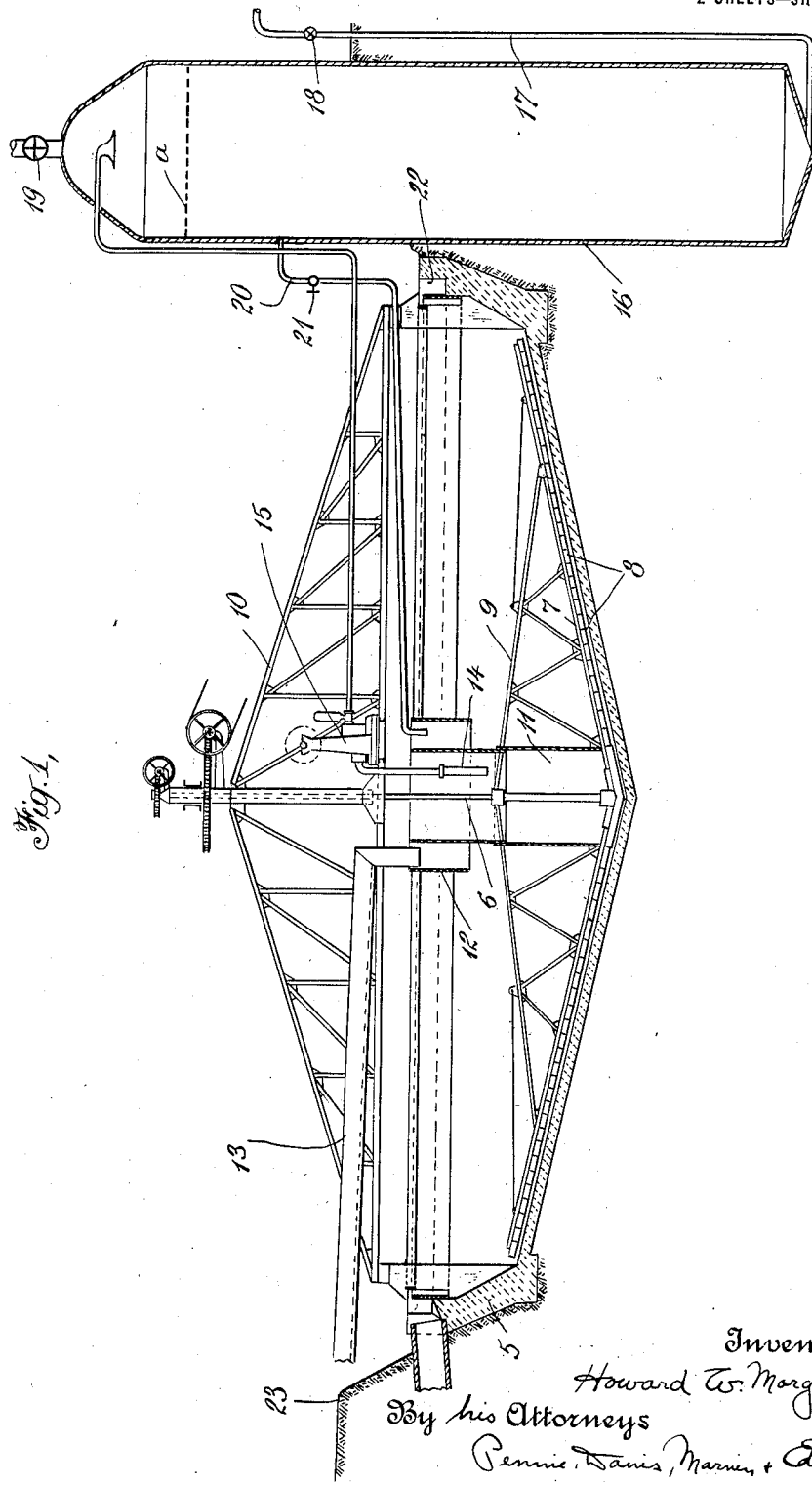

H. W. MORGAN.
SEWAGE TREATMENT.
APPLICATION FILED NOV. 10, 1920.

1,392,197. Patented Sept. 27, 1921.
2 SHEETS—SHEET 1.

Inventor
Howard W. Morgan
By his Attorneys
Pennie, Davis, Marvin & Edmonds

H. W. MORGAN.
SEWAGE TREATMENT.
APPLICATION FILED NOV. 10, 1920.
1,392,197. Patented Sept. 27, 1921.
2 SHEETS—SHEET 2.
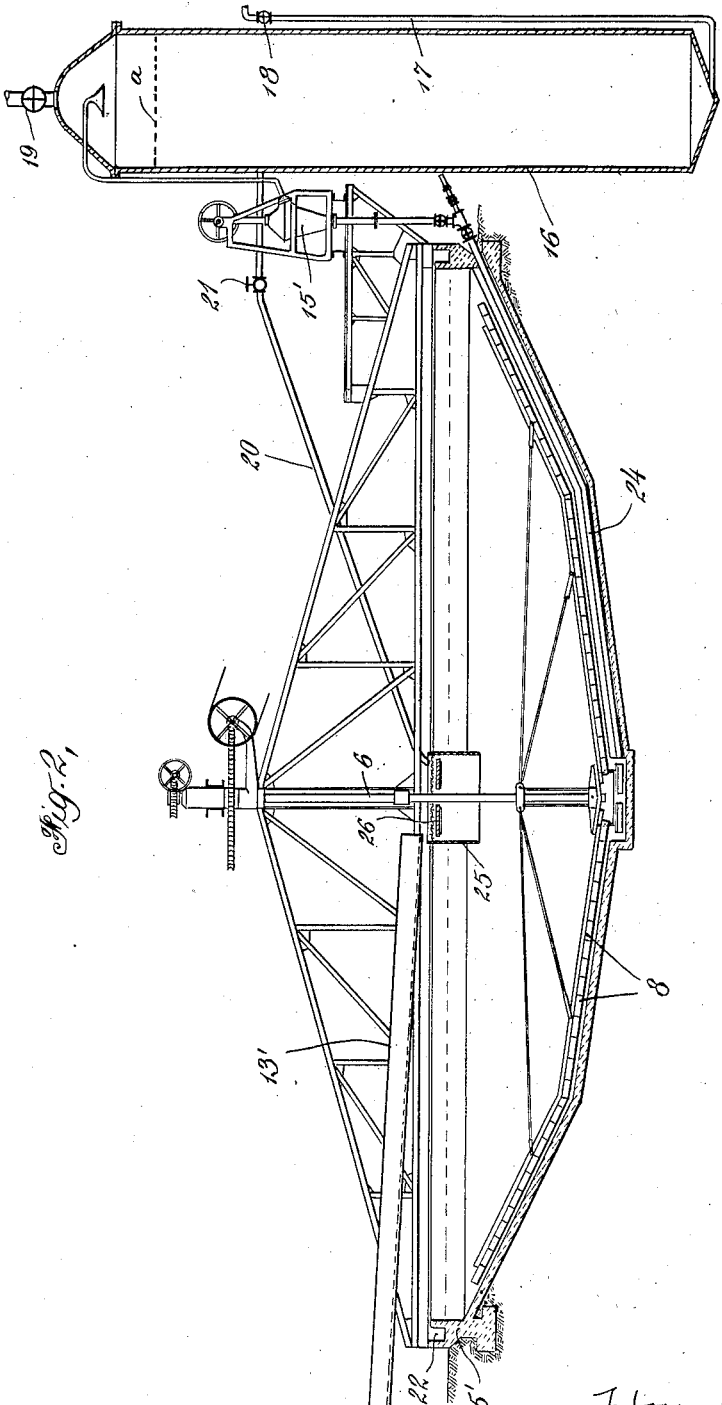
Inventor
Howard W. Morgan
By his Attorneys

UNITED STATES PATENT OFFICE.

HOWARD WALL MORGAN, OF NORTH TARRYTOWN, NEW YORK, ASSIGNOR TO THE DORR COMPANY, A CORPORATION OF DELAWARE.

SEWAGE TREATMENT.

1,392,197.   Specification of Letters Patent.   Patented Sept. 27, 1921.

Application filed November 10, 1920. Serial No. 423,009.

*To all whom it may concern:*

Be it known that I, HOWARD WALL MORGAN, a citizen of the United States, residing at North Tarrytown, in the county of Westchester, State of New York, have invented certain new and useful Improvements in Sewage Treatment; and I do hereby declare the following to be a full, clear, and exact description of the invention, such as will enable others skilled in the art to which it appertains to make and use the same.

This invention relates to the treatment of sewage and has for its object the provision of certain improvements in sewage treatment.

The present invention contemplates the provision of an improved method of and apparatus for the treatment of sewage. Thus, in accordance with the improved method of the invention, the raw sewage, with or without a preliminary screening operation for the removal from the sewage of bulky or other readily removable solid matter, is subjected to sedimentation and decantation in an appropriate basin provided with positively actuated mechanical mechanism for working the settled solid matter toward a discharge outlet in communication with the bottom of the basin, from whence the settled solid matter is discharged as a sludge and this sludge is then subjected to biological digestion. The biological digestion is preferably carried out in a relatively deep tank from which the digested sludge is periodically withdrawn and appropriately disposed of, while the liquid resulting from the biological digestion is returned to the sedimentation and decantation basin, and eventually is permitted to overflow from this basin together with the liquid removed from the raw sewage by decantation. Preferably the sedimentation and decantation step is carried on in a continuous manner, the raw sewage being continuously supplied to the sedimentation and decantation basin and the liquid being permitted to continuously overflow while the settled material is continuously worked by a positively actuated mechanism toward the sludge outlet in communication with the bottom of the basin from whence the resulting sludge is continuously or intermittently withdrawn and appropriately introduced into the digesting tank.

In the accompanying drawings, Figures 1 and 2 diagrammatically represent, in sectional elevation, two forms of apparatus adapted for the practice of the invention.

Referring first to Fig. 1 of the drawings, the sedimentation basin there represented comprises a tank or basin 5, preferably constructed of concrete or cement. It will, however, be understood that the basin may be constructed of any material suitable for the sewage liquors to be treated therein. As represented in Fig. 1, the bottom of the basin slopes gradually toward the center, but I wish it to be understood that this is not an essential feature of the apparatus, since the bottom may be substantially flat, as is now generally the practice in sedimentation basins and thickeners of this general type, or the bottom may slope from the center outwardly in which event the sludge discharge outlet is at or near the periphery of the tank. As represented in Fig. 1, the sedimentation basin is set or built in an excavation or pit in the ground. The bottom of the basin may be built of concrete, cement, or other appropriate material. Where the ground is of a suitable character, no concrete or similar artificial bottom is required, and the bottom of the basin may be formed in the ground itself, preferably by appropriately shaping the bottom and tamping with clay.

A revolving sludge-collecting mechanism is operatively suspended in the basin 5. This mechanism comprises a centrally disposed vertical shaft 6, to the lower end of which are secured radial arms 7 equipped with plows or scrapers 8 for working the settled solid matter toward the center of the basin by the slow rotation of the mechanism. Radial supporting rods or stays 9 are secured at their inner ends to the shaft 6 and at their outer ends to the arms 7, and serve to support the arms 7 in suitable spaced relation with the bottom of the basin.

The shaft 6 is rotatably supported by a superstructure 10 mounted above the top of the basin. The revolving sludge-collecting mechanism is suspended in the basin, and, being entirely supported from above the top of the basin, all operative parts of the mechanism are readily accessible for inspection and repair.

Surrounding the shaft 6, and concentric therewith is a sludge-well 11. The sludge-well is secured to and rotates with the sludge-collecting mechanism and extends downwardly from just above the top of the basin 5 into proximity with the bottom thereof. The sludge-well 11 is surrounded at its top by a stationary cylindrical baffle or drum 12 which extends downwardly from about the top of the sludge-well to an appropriate distance beneath the normal operating liquid level in the basin. The raw sewage to be subjected to sedimentation and decantation flows through the inlet or conduit 13 and is introduced into the basin in the annular space provided between the sludge-well 11 and the baffle 12.

The sludge-well 11 is in communication at its lower end with the sludge or settled solid matter worked toward the center of the basin by the plows 8 of the revolving mechanism. The top of the sludge well is preferably open, so that any bulky objects finding their way into the well may be grappled from above and removed. Being open at the top, it will further be observed that the atmospheric pressure on the sludge in the well is the same as the atmospheric pressure on the material in the basin and outside the well, and by maintaining the level of the sludge in the well slightly lower than the level of the sewage in the basin, a flow of sludge from the bottom of the basin into the well is appropriately maintained. Thus, a sludge-pipe 14 extends downwardly into the well 11 to about the point where the stays 9 are attached to the shaft 6. A pump 15 is operatively connected to the pipe 14 for pumping the sludge from the well 11 into the top of the digesting tank 16.

The digesting tank 16 is relatively deep and may be sunk for a considerable portion of its length beneath the ground level. A conduit or pipe 17 having a valve 18 communicates with the bottom of the digesting tank and permits the withdrawal at appropriate intervals of digested sludge from the tank. Preferably this withdrawal of digested sludge from the tank 16 is effected by the hydrostatic head of the liquor in the tank, but where this is impracticable, a pump or other appropriate means may be used for withdrawing the digested sludge from the tank 16.

The digesting tank 16 may, if desired, be open at its top, or, if covered at the top, is provided with an opening 19 for the exit of gases generated during the biological digestion of the sludge. A conduit or pipe 20 having a valve 21 communicates with the interior of the tank 16 at the upper portion thereof and serves to conduct back to the sedimentation and decantation basin that portion of the sludge which is liquefied in the tank 16 by the biological digestion.

In accordance with the present invention, in its preferred aspect, the raw sewage is continuously fed into the sedimentation and decantation basin from the sewage inlet pipe 13. Sedimentation and decantation goes on continuously in the basin 5, and in the course of this treatment solid matter, largely putrescible organic matter, settles toward the bottom of the basin and is worked toward the sludge-well by the revolving sludge-collecting mechanism. At the top of the basin an effluent is permitted to continuously overflow into a peripheral launder 22 and may be disposed of in any appropriate manner. This effluent is not stable and is often turbid, but in many localities it can be satisfactorily disposed of in a manner which would be entirely unsatisfactory for the disposal of the raw sewage. It may be further treated by any of the well known processes for the production of a clear and stable effluent.

The settled solid matter or sludge collecting in the sludge well 11 is continuously or intermittently withdrawn through the sludge-pipe 14 and introduced into the digesting tank 16. In the digesting tank 16 the sludge is subjected to biological digestion. A relatively long period of time, usually from a few weeks to several months, is required to complete the biological digestion of the sludge in the tank 16. When the desired biological action is completed a portion or all of the resulting digested sludge is withdrawn through the pipe 17 and appropriately disposed of. The valve 18 is then closed and the biological digestion in the tank 16 is continued with the continuous or intermittent introduction into the tank of sewage sludge from the sedimentation and decantation basin.

The amount of sludge withdrawn from the basin 5 in the treatment of ordinary municipal or domestic sewage will be about 1/300 of the total volume of sewage fed into the basin from the sewage inlet pipe 13. A comparative idea of the respective sizes of the sedimentation basin and digesting tank required for the treatment of ordinary municipal sewage, in accordance with what I now consider to be the preferred form of the invention, may be had from a particular design in which three basins 100 feet in diameter and eleven feet in depth are employed for feeding sewage sludge to four digestion tanks 30 feet in diameter and 30 feet deep.

One of the characteristic actions of certain types of bacteria in digesting sewage sludge is that they cause an evolution of gas. By conducting the biological digestion with the aid of such bacteria in relatively deep tanks, as contemplated by the present invention, a large amount of gas is retained in the sludge, thereby making the sludge porous and more readily dried when discharged from the digesting tank.

In the course of the biological digestion a portion of the sewage sludge is liquefied.

This liquefied sludge collects near the top of the liquor in the digesting tank 16 and at appropriate intervals is withdrawn through the pipe 20 and introduced into the sedimentation and decantation basin, from whence this liquor eventually finds its way to the overflow launder 22 of the basin. Considerable scum is formed during the biological digestion of the sewage in the tank 16, and this scum floats on top of the liquor in the tank. When desired, this scum may be removed and disposed of in any appropriate manner.

From the foregoing description it will be noted that in accordance with the principles of the present invention sedimentation and decantation of the raw sewage is carried on in shallow, substantially flat-bottomed basins, while biological digestion of the sludge resulting from this sedimentation and decantation treatment is carried on in relatively deep tanks. The positively actuated mechanism employed in the sedimentation and decantation basin for working settled solid matter toward the sludge outlet effectively prevents any septic fermentation taking place in the sedimentation chamber. Whenever raw sewage is allowed to stand at rest for any substantial period of time, septic fermentation will take place. Such septic fermentation in sewage is objectionable, and in accordance with the present invention is not encouraged.

A further advantage of the present invention resides in the facility with which the sewage is handled. Thus, the major portion of the liquid content of the sewage is decanted into the peripheral launder 22 and often may be directly discharged through an outlet pipe 23 into a neighboring river or the like. Only 1/300 part of the total volume of sewage flowing through the sewer inlet pipe 13 needs to be handled by the pump 15, and even here it is only required to pump this relatively small volume of material to the top of the digesting tank 16 which may be placed for a considerable portion of its length beneath the level of the ground. Thus, by the practice of the invention, the excavation or pumping charges, as the case may be, are very materially reduced as compared with the heretofore customary practice of treating sewage.

The apparatus illustrated in Fig. 2 is of substantially the same type as illustrated in Fig. 1, and similar elements of the apparatus of Fig. 2 are indicated by the same reference characters as used in connection with Fig. 1. The principal difference between the apparatus of Fig. 2 and that of Fig. 1 resides in the manner in which the settled solid matter or sludge is withdrawn from the sedimentation and decantation basin. Thus, in the apparatus of Fig. 2, a conduit 24 is embedded in the bottom of the sedimentation and decantation basin 5'. This conduit communicates with the bottom of the basin, near the center thereof, and is operatively connected to a pump 15' which serves to withdraw the settled solid matter or sludge from the basin 5' and to introduce the same into the digesting tank 16. The raw sewage is introduced into the sedimentation and decantation basin 5' through a sewer inlet pipe 13'. To this end a loading or feeding well 25 may be provided surrounding the rotatable shaft 6. A floating screen 26 is arranged in the loading well 25 and the sewage from the pipe 13' passes through the screen 26, whereby any bulky objects are removed and not permitted to pass into the sedimentation and decantation basin. Otherwise the construction and mode of operation of the apparatus illustrated in Fig. 2 is substantially the same as that of the apparatus illustrated in Fig. 1, and accordingly requires no further description.

It will, of course, be understood that the construction and arrangement of apparatus illustrated in the accompanying drawings are to be considered as merely explanatory of the principles of the invention, and that various changes may be made in the constructions and arrangements illustrated without departing from the spirit of the invention. Thus, for example, the digesting tank may be positioned entirely beneath the sedimentation and decantation basin, thereby dispensing with the need for the pump 15', and the sludge discharge outlet in communication with the bottom of the basin may be at or near the periphery of the bottom instead of at the center as illustrated. These and other obvious modifications of the invention are intended to be covered by the language of the appended claims.

I claim:

1. The method of treating sewage which comprises, subjecting the sewage to sedimentation and decantation in an appropriate basin having a sludge discharge outlet in communication with the bottom thereof, mechanically working material settling on the bottom of said basin toward said outlet, withdrawing settled material through said outlet in the form of sludge, and supplying such withdrawn sludge to a relatively deep body of similarly obtained sludge undergoing biological digestion.

2. The method of treating sewage which comprises, subjecting the sewage to sedimentation and decantation in the course of which solid matter in the sewage settles by gravity and is mechanically worked toward an appropriate discharge outlet, withdrawing settled solid matter through said discharge outlet in the form of sludge, and subjecting said sludge to biological digestion.

3. The method of treating sewage which comprises, subjecting the sewage to sedimentation and decantation in an appropriate basin having a sludge discharge outlet in communication with the bottom thereof, mechanically working material settling on the bottom of said basin toward said outlet, withdrawing settled matter through said outlet in the form of sludge, subjecting said sludge to biological digestion, and returning to the sedimentation and decantation treatment the liquid resulting from said biological digestion.

4. The method of treating sewage which comprises, subjecting the sewage to sedimentation and decantation in an appropriate basin having a sludge discharge outlet in communication with the bottom thereof, continuously supplying fresh sewage to said basin, permitting the continuous overflow of liquid from the top of said basin, continuously working settled solid matter by a positively actuated mechanical motion toward said discharge outlet, continuously withdrawing settled solid matter through said outlet in the form of sludge, and supplying such withdrawn sludge to a body of similarly obtained sludge undergoing biological digestion.

5. The method of treating sewage which comprises, subjecting the sewage to sedimentation and decantation in an appropriate basin having a sludge discharge outlet in communication with the bottom thereof, continuously supplying fresh sewage to said basin, permitting the continuous overflow of liquid from the top of said basin, continuously working settled solid matter by a positively actuated mechanical motion toward said discharge outlet, continuously withdrawing settled solid matter through said outlet in the form of sludge, supplying such withdrawn sludge to a body of similarly obtained sludge undergoing biological digestion, periodically withdrawing digested sludge from said body of sludge undergoing biological digestion, and periodically returning to said basin liquid resulting from said biological digestion.

6. The method of treating sewage which comprises, subjecting the sewage to sedimentation and decantation in a basin of relatively shallow depth compared with its diameter and having a sludge discharge outlet in communication with the bottom thereof, mechanically working material settling on the bottom of said basin toward said outlet, withdrawing settled material through said outlet in the form of sludge, and subjecting said sludge to biological digestion in a digesting tank of considerable depth.

7. The method of treating sewage which comprises, subjecting the sewage to sedimentation and decantation in an appropriate basin having a sludge discharge outlet in communication with the bottom thereof, mechanically working material settling on the bottom of said basin toward said outlet by a positively actuated mechanical motion, withdrawing settled material through said outlet in the form of sludge, and subjecting said sludge to biological digestion.

In testimony whereof I affix my signature.

HOWARD WALL MORGAN.